United States Patent
Ino

(10) Patent No.: US 11,077,656 B2
(45) Date of Patent: Aug. 3, 2021

(54) INKJET RECORDING APPARATUS

(71) Applicant: FUJIFILM Business Innovation Corp., Tokyo (JP)

(72) Inventor: Naosuke Ino, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/888,968

(22) Filed: Jun. 1, 2020

(65) Prior Publication Data

US 2021/0101385 A1    Apr. 8, 2021

(30) Foreign Application Priority Data

Oct. 3, 2019  (JP) .............................. JP2019-182748

(51) Int. Cl.
*B41J 2/045*    (2006.01)
*B41J 2/14*    (2006.01)

(52) U.S. Cl.
CPC ....... *B41J 2/04516* (2013.01); *B41J 2/04586* (2013.01); *B41J 2/14201* (2013.01)

(58) Field of Classification Search
CPC ................ B41J 2/04516; B41J 2/04586; B41J 2/14201; B41J 2/1433; B41J 2/162; B41J 2002/14475
See application file for complete search history.

(56) References Cited

U.S. PATENT DOCUMENTS

| | | | | |
|---|---|---|---|---|
| 4,963,882 A | * | 10/1990 | Hickman | ................ B41J 2/2132 347/41 |
| 2010/0165022 A1 | * | 7/2010 | Makuta | .................. B41J 2/0451 347/9 |
| 2014/0184696 A1 | * | 7/2014 | Kyoso | .................... B41J 2/2146 347/40 |
| 2016/0347058 A1 | | 12/2016 | Suzuki et al. | |

FOREIGN PATENT DOCUMENTS

| | | |
|---|---|---|
| JP | 2013-132749 | 7/2013 |
| JP | 5656816 | 12/2014 |
| JP | 2016-221841 | 12/2016 |

OTHER PUBLICATIONS

English language machine translation of JP 2013-132749.
English language machine translation of JP 5656816.

* cited by examiner

*Primary Examiner* — Kristal Feggins
(74) *Attorney, Agent, or Firm* — Fildes & Outland, P.C.

(57) ABSTRACT

Provided is an inkjet recording apparatus including: a nozzle configured to eject droplets including a first droplet and a second droplet larger than the first droplet; a moving mechanism that moves a sheet relative to the nozzle; and a processor configured to generate ejection data for the droplets, the ejection data corresponding to a dot image formed by ejecting the droplets from the nozzle on the sheet moved relatively to the nozzle by the moving mechanism, wherein the processor is configured to replace the second droplet for a pixel of interest in an original ejection data for generating the ejection data with the first droplet when the droplets are not ejected for n pixels in a row after the pixel of interest to generate the ejection data, where n is an integer of 2 or more.

4 Claims, 9 Drawing Sheets

INKJET RECORDING APPARATUS

CROSS-REFERENCE TO RELATED APPLICATIONS

This application is based on and claims priority under 35 USC 119 from Japanese Patent Application No. 2019-182748 filed on Oct. 3, 2019.

BACKGROUND

Technical Field

The present invention relates to an inkjet recording apparatus.

Related Art

An inkjet recording apparatus is known which ejects liquid droplets toward a sheet of paper to record an image. In the inkjet recording apparatus, droplets (so-called satellite droplets) smaller than a main droplet may land on the sheet with a delay in a sheet feeding direction, and image quality may deteriorate. Therefore, a technique for inhibiting the deterioration of the image quality caused by the satellite droplets is known.

Patent Literature 1 describes an inkjet recording apparatus capable of supplying, to a piezoelectric element of a nozzle, a first drive signal that causes main droplets to be ejected from a nozzle and a second drive signal that causes main droplets to be ejected from a nozzle and allows generation of satellite droplets. In the inkjet recording apparatus, when a gradation of a peripheral pixel close to a target pixel is less than a reference value, the first drive signal is supplied to a piezoelectric element of a nozzle that forms the target pixel, so that landing of satellite droplets to the peripheral pixel having a low gradation is prevented, and image deterioration is prevented.

CITATION LIST

Patent Literature

Patent Literature 1: JP-A-2013-132749

SUMMARY

In an inkjet recording apparatus capable of ejecting droplets in different sizes, satellite droplets are likely to generate at a rear part of a rear end of an image when relatively large droplets land on the rear end of the image.

Aspects of non-limiting embodiments of the present disclosure relate to prevent satellite droplets from generating rearward than a rear end of an image, compared with a case where relatively large droplets land on a rear end of an image.

Aspects of certain nonlimiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inkjet recording apparatus including: a nozzle configured to eject droplets including a first droplet and a second droplet larger than the first droplet; a moving mechanism that moves a sheet relative to the nozzle; and a processor configured to generate ejection data for the droplets, the ejection data corresponding to a dot image formed by ejecting the droplets from the nozzle on the sheet moved relatively to the nozzle by the moving mechanism, wherein the processor is configured to replace the second droplet for a pixel of interest in an original ejection data for generating the ejection data with the first droplet when the droplets are not ejected for n pixels in a row after the pixel of interest to generate the ejection data, where n is an integer of 2 or more.

BRIEF DESCRIPTION OF DRAWINGS

Exemplary embodiment(s) of the present invention will be described in detail based on the following figures, wherein.

DETAILED DESCRIPTION

Figure 1:
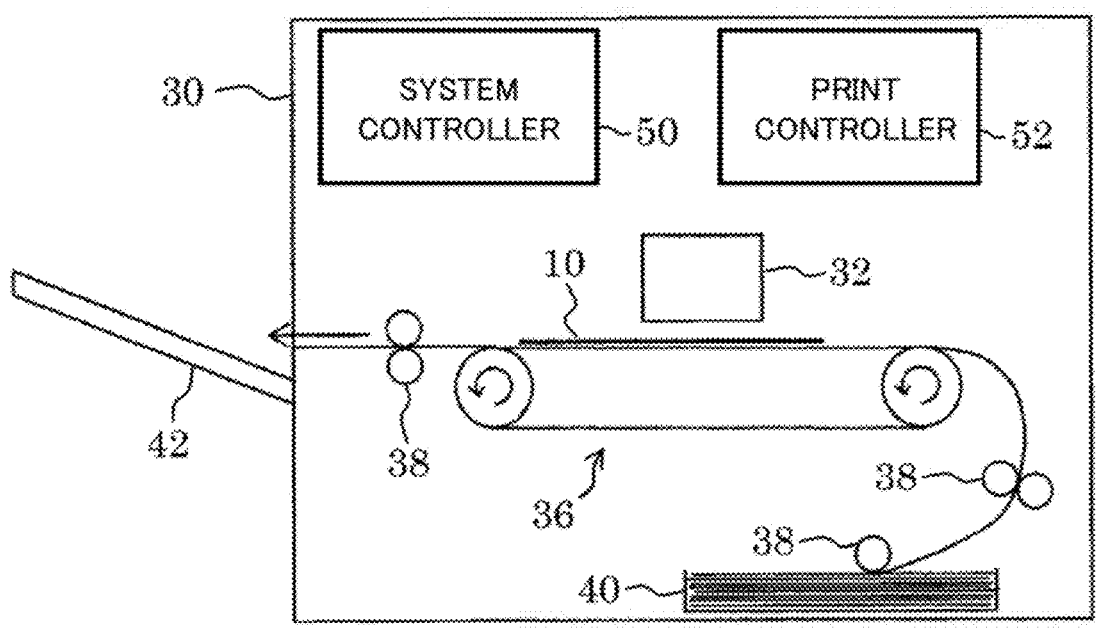
FIG. 1 is a diagram showing a schematic configuration of an inkjet recording apparatus according to an exemplary embodiment of the present invention.

Hereinafter, exemplary embodiments of the present invention will be described in detail with reference to the accompanying drawings. The configuration described below is merely an example for explanation, and may be appropriately changed in accordance with the specifications of an inkjet recording apparatus and the like. In addition, when a plurality of exemplary embodiments and modifications are contained in the following description, it is assumed from the beginning that these characteristic parts are used in combination as appropriate. In all the drawings, the same elements are denoted by the same reference numerals, and a repetitive description thereof will be omitted.

FIG. 1 is a diagram showing a schematic configuration of an inkjet recording apparatus 30 according to an exemplary embodiment of the present invention. The inkjet recording apparatus 30 includes an inkjet head unit 32 that stores an inkjet head having a plurality of nozzles that eject ink droplets onto a sheet 10 as a printing medium, and a moving mechanism 36 for the sheet 10. The ink is supplied from an ink tank (not shown) to the inkjet head unit 32 through a pipe.

The inkjet recording apparatus 30 includes a system controller 50 and a print controller 52. The system controller 50 functions as a control apparatus that controls the entire inkjet recording apparatus 30. The system controller 50 receives image data from an outside of the apparatus and receives an instruction from an operation panel (not shown) provided in the inkjet recording apparatus 30, and controls the print controller 52 and the moving mechanism 36. The print controller 52 operates in accordance with the instruction from the system controller 50, generates ink ejection data from the image data input from the outside of the apparatus, and supplies the ink ejection data to the inkjet head unit 32. In addition, the print controller 52 controls the inkjet head unit 32.

The sheet 10 is supplied from a paper feed tray 40 and is printed while being moved below the inkjet head unit 32 by the moving mechanism 36 (also referred to as a transport mechanism) including a moving belt (also referred to as a transport belt), and then is sent to a paper discharge tray 42. The sheet 10 is moved from the paper feed tray 40 to the paper discharge tray 42 via a plurality of rollers 38.

Figure 2:
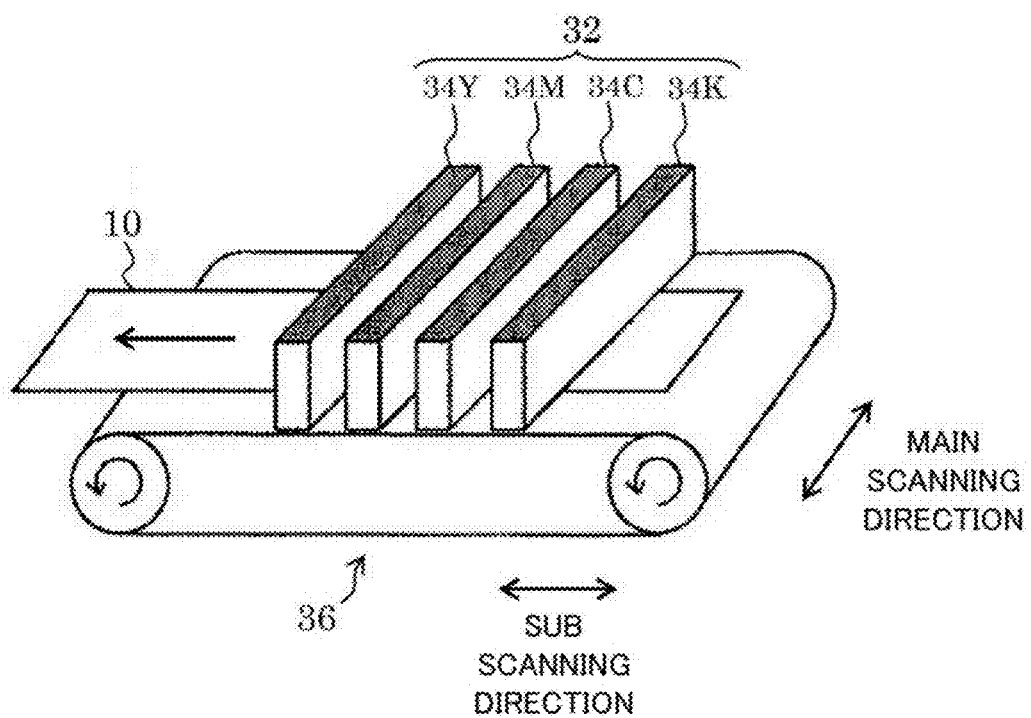
FIG. 2 is a diagram showing a configuration of an inkjet head unit in FIG. 1.

FIG. 2 is a diagram showing a configuration of the inkjet head unit 32 in FIG. 1. As shown in FIG. 2, the inkjet head unit 32 includes four inkjet heads 34C, 34M, 34Y, and 34K that respectively eject ink droplets of four colors of cyan (C), magenta (M), yellow (Y), and black (K). Each inkjet head is a line-type bead that covers an entire width of a printing area of the sheet 10, and ejects ink droplets all at once in a width direction (also referred to as a main scanning direction) of the printing area of the sheet 10. A length direction of the sheet 10 (the same as a moving direction of the sheet 10) is also referred to as a sub-scanning direction.

Figure 3:
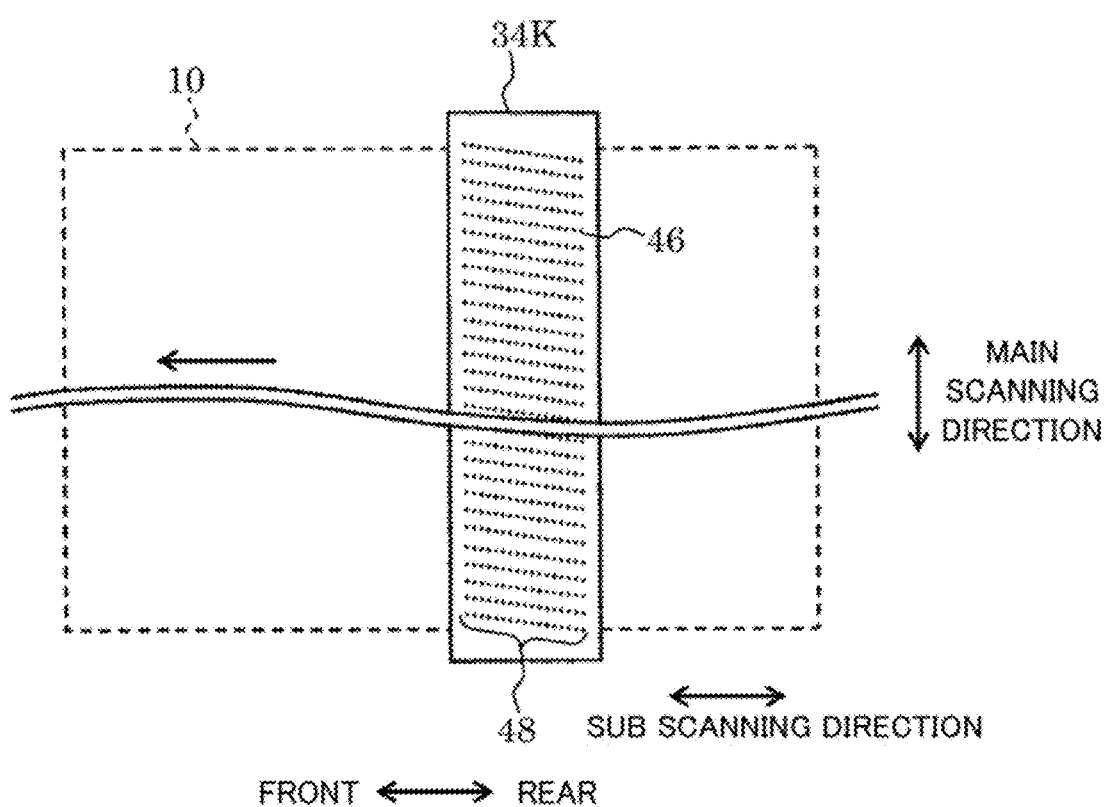
FIG. 3 is a diagram showing an arrangement of nozzles of an inkjet head in FIG. 2.

FIG. 3 is a diagram showing an example of an arrangement of nozzles of the inkjet head 34K in FIG. 2. Other inkjet heads 34C, 34M, and 34Y also have the same arrangement of nozzles as that of the inkjet head 34K. As shown in FIG. 3, the inkjet head 34K includes, on a bottom surface facing the sheet 10, a plurality of nozzles 46 that eject ink droplets. The plurality of nozzles 46 are arranged in rows and constitute a plurality of nozzle rows 48, and the nozzle rows 48 are lined up in the main scanning direction in a state of being inclined from the sub-scanning direction by a predetermined amount. Each of the nozzles 46 may eject, as an ink droplet, a small droplet (also referred to as a first droplet) and a medium droplet (also referred to as a second droplet) that is larger than the small droplet.

In the exemplary embodiment, printing is performed by moving the sheet 10 with respect to the inkjet heads 34C, 34M, 34Y, and 34K, and printing may be performed by moving the inkjet heads 34C, 34M, 34Y, and 34K with respect to the sheet 10.

Figure 4:
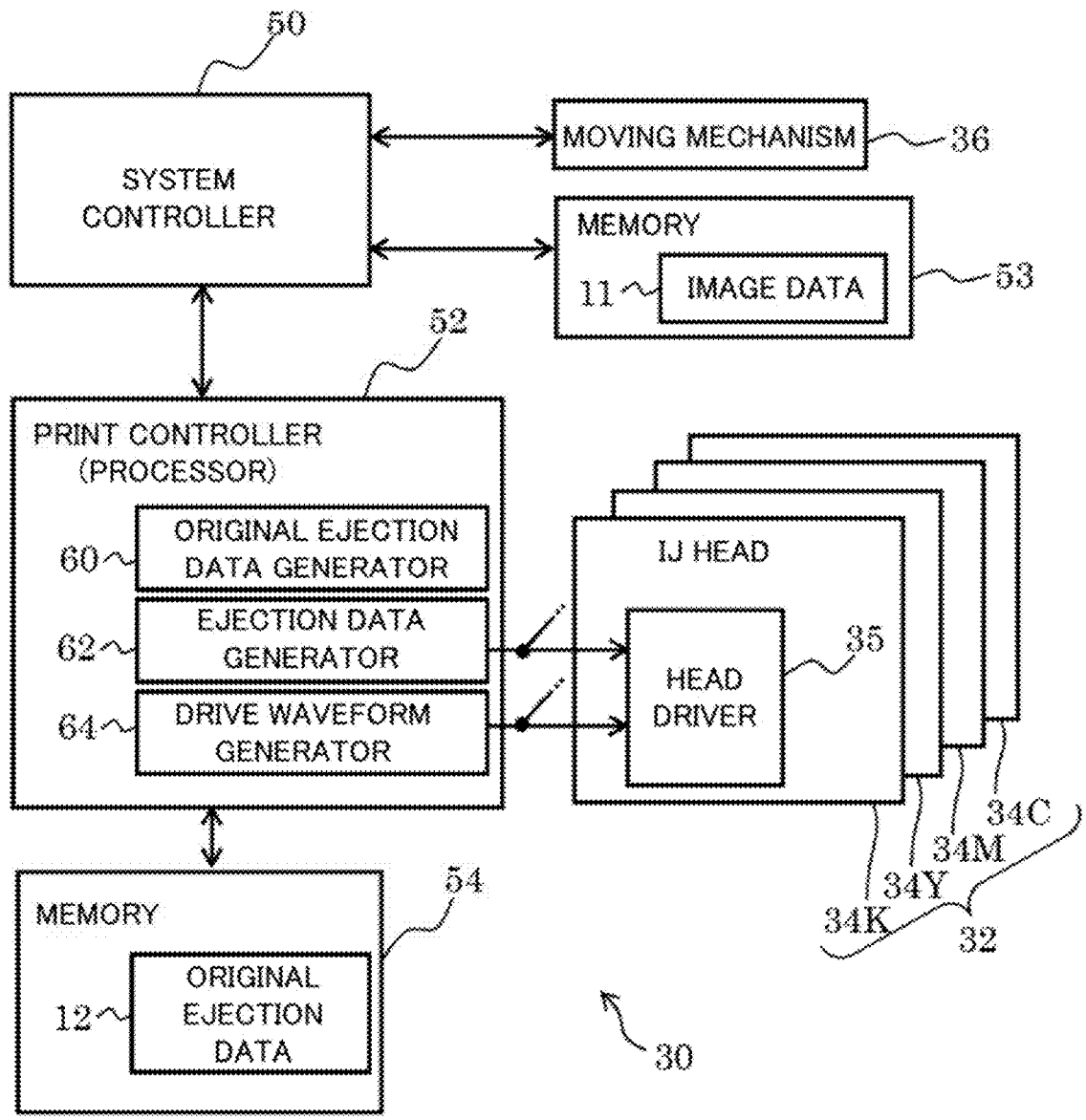
FIG. 4 is a diagram showing a control configuration of the inkjet recording apparatus according to the exemplary embodiment of the present invention.

FIG. 4 is a block diagram showing a control configuration of the inkjet recording apparatus 30. The print controller 52 may be configured with a processor, and functions as an original ejection data generator 60, an ejection data generator 62, and a drive waveform generator 64. The inkjet recording apparatus 30 includes memories 53 and 54, and the memories 53 and 54 are, for example, a memory (e.g., a RAM or a flash memory) including a semiconductor element, a hard disk, or the like.

Here, a flow of a series of processing from an input of an image to formation of the image on a sheet will be described. Image data to be printed is input from an outside of the apparatus, and is stored in the memory 53 by the system controller 50. At this stage, for example, RGB multi-valued image data 11 is stored in the memory 53. The RGB image data 11 stored in the memory 53 is sent to the print controller 52 via the system controller 50.

The original ejection data generator 60 of the print controller 52 performs processing of converting the RGB image data 11 into original ejection data 12 (also referred to as original dot data) for each of four colors of CMYK. Specifically, the following processing is performed. First, the original ejection data generator 60 converts the RGB image data 11 into density data (e.g., 256 gradations) for each of the four colors of CMYK. Then, the original ejection data generator 60 performs halftone processing on density data tier each of the four colors of CMYK, and generates the original ejection data 12 for each of the four colors of CMYK. The halftone processing generates, from the density data, the original ejection data 12 including three values (no ejection, a small droplet, and a medium droplet) that indicates whether ink droplets are ejected. Various known methods such as an error diffusion method, a dither method, a threshold matrix method, and a density pattern method may be applied as methods for the halftone processing.

The generated original ejection data 12 for the four colors for CMYK is temporarily stored in the memory 54. The ejection data generator 62 generates ejection data for each of four colors of CMYK by reading the original ejection data 12 from the memory 54 and performing replacement processing (details will be described below), which inhibits image deterioration due to satellite droplets, on the original ejection data 12 for each of the four colors of CMYK. Then, the ejection data generator 62 supplies the ejection data for each of the four colors of CMYK to a head driver 35 of each of the inkjet heads 34C, 34M, 34Y, and 34K. Note that replacement processing for inhibiting image deterioration due to satellite droplets, which will be described below, may be performed only for a specific ink color, and in that case, ejection data for an ink color that is not subjected to the replacement processing is the same as the original ejection data 12 therefor.

The drive waveform generator 64 generates a drive signal waveform that drives a piezoelectric element corresponding to each nozzle for ejecting ink from each nozzle of each of the inkjet heads 34C, 34M, 34Y, and 34K, and supplies the generated drive signal waveform to the head driver 35 of each of the inkjet heads 34C, 34M, 34Y, and 34K. In the exemplary embodiment, the drive waveform generator 64 generates three kinds of drive signal waveforms corresponding to the non-ejection, the small droplet, and the medium droplet, and supplies the drive signal waveforms to each of the head drivers 35.

The head driver 35 of each of the inkjet heads 34C, 34M, 34Y, and 34K drives the piezoelectric element of respective nozzles by using the ejection data and the drive signal waveform, thereby causing ink droplets to be ejected from the corresponding nozzles. Ink droplets are ejected from the respective nozzles of the inkjet heads 34C, 34M, 34Y, and 34K in synchronization with the moving speed of the sheet 10 to form an image on the sheet 10.

Next, the processing of the ejection data generator 62 will be described in detail. Hereinafter, the ink color of black will be described as an example, and it is also possible to perform the same processing for other ink colors. First, liquid-droplet replacement processing by the ejection data generator 62 in another embodiment which is not an exemplary embodiment of the present invention, which has been studied by the inventors, will be described.

Figure 12A:
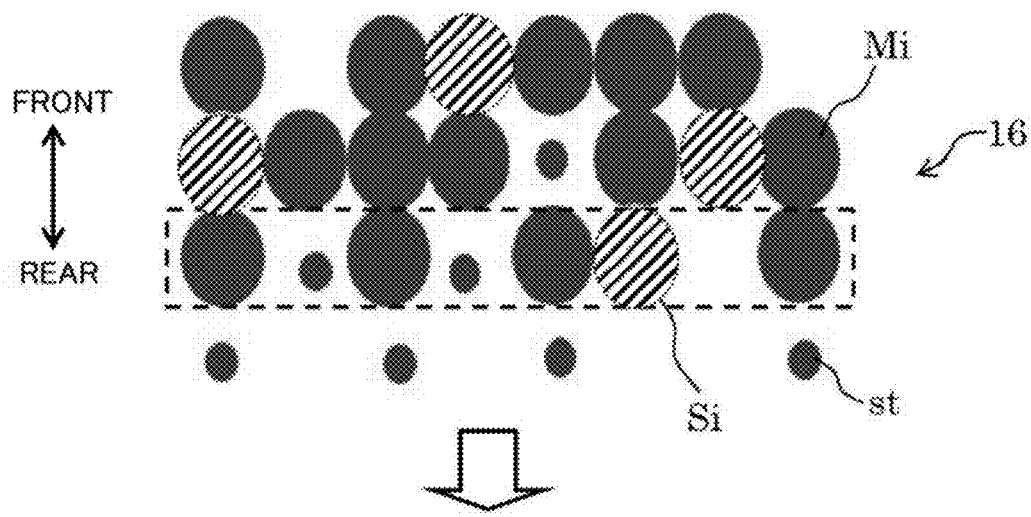
FIG. 12A is a diagram for showing replacement of liquid droplets in another exemplary embodiment of the present invention.
Figure 12B:
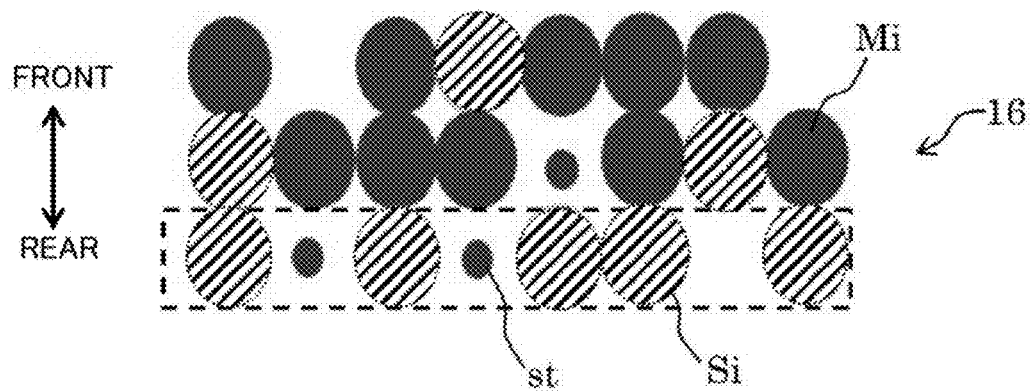
FIG. 12B is a diagram for showing replacement of liquid droplets in another exemplary embodiment of the present invention.

FIGS. 12A and 12B are diagrams showing the liquid-droplet replacement processing in the different mode. FIG. 12A shows an example of an image (also referred to as a dot image 16) formed on a sheet when the replacement processing is not performed. FIG. 12B shows an example of the dot image 16 formed on a sheet when the replacement processing is performed. The broken lines shown in FIGS. 12A and 12B indicate a position or a section of a pixel, and do not constitute the dot image 16. In FIGS. 12A and 12B and the following drawings, a small droplet Si is indicated by a gray ellipse, a medium droplet Mi is indicated by a black ellipse having a large size, and a satellite droplet st is indicated by a black ellipse having a small size.

When a relatively large ink droplet is ejected from a nozzle, a satellite droplet is ejected accompanying a main droplet and lands on a rear side in a sheet travel direction. FIG. 12A shows a state where a satellite droplet st ejected accompanying a medium droplet Mi lands one pixel rear of the medium droplet Mi. Even though the satellite droplet st is ejected accompanying the medium droplet Mi, if another ink droplet is disposed on a pixel after the pixel where the medium droplets Mi is disposed, the satellite droplet is less likely to appear on a sheet since the satellite droplet fuses with the another ink droplet in the air.

For example, when a satellite droplet st is generated rearward than a line constituting a character or the like, the satellite droplet is very noticeable on a sheet. Therefore, in the different mode, processing of replacing a medium droplet Mi, in a pixel row (a pixel row surrounded by the broken line in FIG. 12A) constituting a rear end of the image, with a small droplet Si that is not or hardly accompanied by a satellite droplet st.

Figure 13:
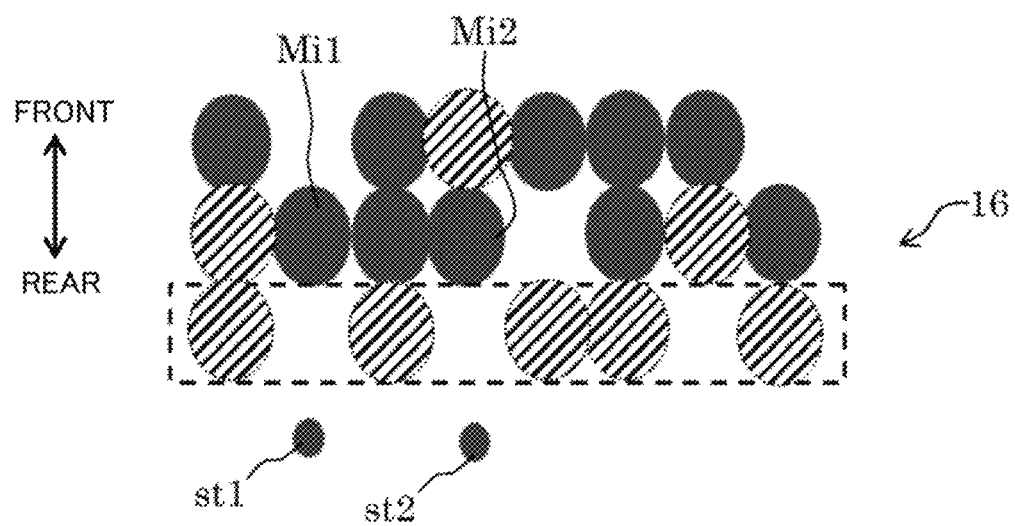
FIG. 13 is a diagram showing an example of satellite droplets on a sheet, which may occur when another exemplary embodiment of the present invention is employed.
Figure 14:
FIG. 14 is a diagram showing an example of an image on a sheet when another exemplary embodiment of the present invention is employed.

However, according to the study by the inventors, it has been found that the image quality may not be improved even though such replacement processing is performed. The reason why the image quality is not improved is that, as shown in FIG. 13, satellite droplets st1 and st2, which accompany medium droplets Mi1 and Mi2 on a front side (inward than an edge of an image) of a pixel row (a pixel row surrounded by the broken line in FIG. 13) constituting a rear end of an image, land rearward than the rear end of the image. That is, the satellite droplet st ejected accompanying the medium droplet Mi lands on a pixel that is two or more pixels behind the pixel where the medium droplet Mi is disposed. FIG. 14 is a diagram showing an example of an image on a sheet when the different mode is employed. As shown in FIG. 14, it may be seen that satellite droplets land on a rear side (a lower side) of lines constituting a character. In order to address this problem, an exemplary embodiment of the present invention has been studied.

Figure 5A:
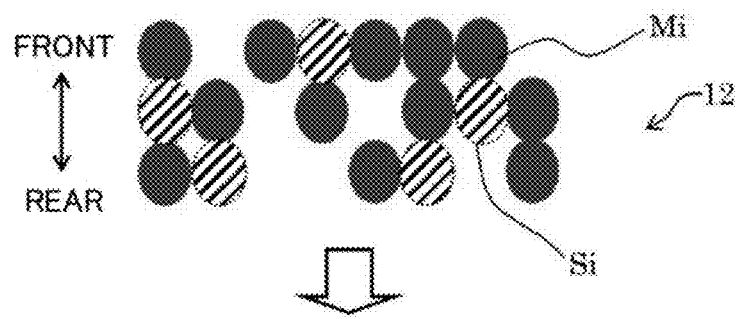
FIG. 5A is a diagram for showing replacement of droplets according to the exemplary embodiment of the present invention.
Figure 5B:
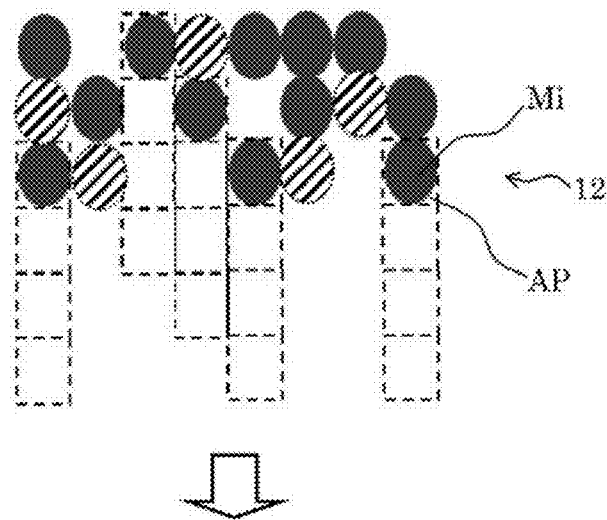
FIG. 5B is a diagram for showing replacement of droplets according to the exemplary embodiment of the present invention.
Figure 5C:
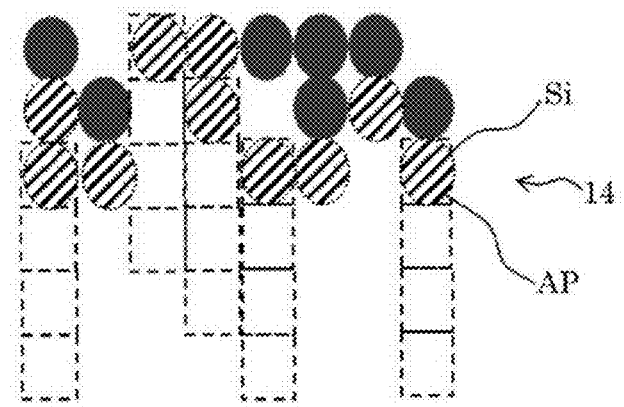
FIG. 5C is a diagram for showing replacement of droplets according to the exemplary embodiment of the present invention.

Next, processing of the ejection data generator 62 of the exemplary embodiment of the present invention will be described. FIGS. 5A, 5B, and 5C are diagrams showing replacement processing of droplets performed by the ejection data generator 62 of the exemplary embodiment of the present invention. FIGS. 5A and 5B show an example of the original ejection data 12 before the replacement processing. FIG. 5C shows an example of the ejection data 14 after the replacement processing. When n pixels (where n is an integer of 2 or more) in which ink droplets are not ejected are continuous on a rear side of an attention pixel AP, which is a pixel in which a medium droplet Mi (a second droplet) is disposed, in the original ejection data 12, the ejection data generator 62 replaces the medium droplet Mi in the attention pixel AP with a small droplet Si (a first droplet) to generate the ejection dam 14. FIGS. 5A, 5B, and 5C show an example in which a medium droplet Mi in an attention pixel AP is replaced with a small droplet Si when three pixels, in which ink droplets are not ejected, are continuous on a rear side of the attention pixel AP. FIG. 5B shows a state where a pixel to be replaced is searched from the image of FIG. 5A. FIG. 5C shows a state where a medium droplet Mi searched in FIG. 5B is replaced with a small droplet Si.

According to the exemplary embodiment of the present invention, a medium droplet Mi on the front side of the pixel row constituting the rear end of the image (inner side of the image) is also a replacement target and is replaced with a small droplet Si. Therefore, it is possible to inhibit the satellite droplet st accompanying the medium droplet Mi on the front side of the rear end of the image from landing rearward than the rear end of the image. Naturally, since a medium droplet Mi in the pixel row constituting the rear end of the image is also replaced with a small droplet Si, a satellite droplet st accompanying the medium droplet Mi is also prevented. In this way, it is possible to prevent or inhibit satellite droplets from generating at the rear part of the rear end of the image. Therefore, deterioration in image quality of the rear end part of the image may be inhibited.

In addition, according to the exemplary embodiment of the present invention, a medium droplet Mi in an area at the rear end of the image (an area, where pixels in which ink droplets are not ejected are continuous, on the lower side) may be positively a replacement target by setting n to 2 or larger. On the other hand, the medium droplet Mi to be replaced is limited, so that unnecessary replacement (e.g., replacement from a medium droplet Mi at a central part of the image to a small droplet Si) may be inhibited, and a reduction in image density may be inhibited.

Figure 6:
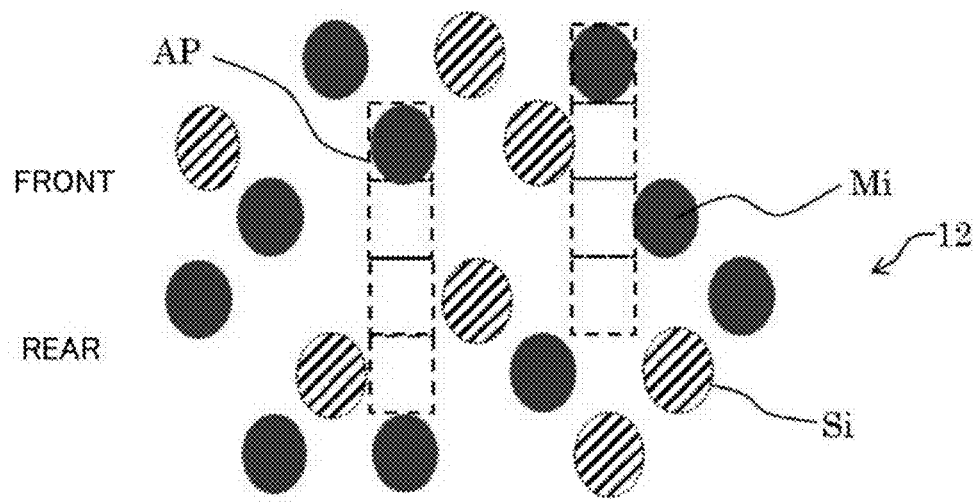
FIG. 6 is a diagram for showing a limit of replacement of droplets applicable to the exemplary embodiment of the present invention.
Figure 7:
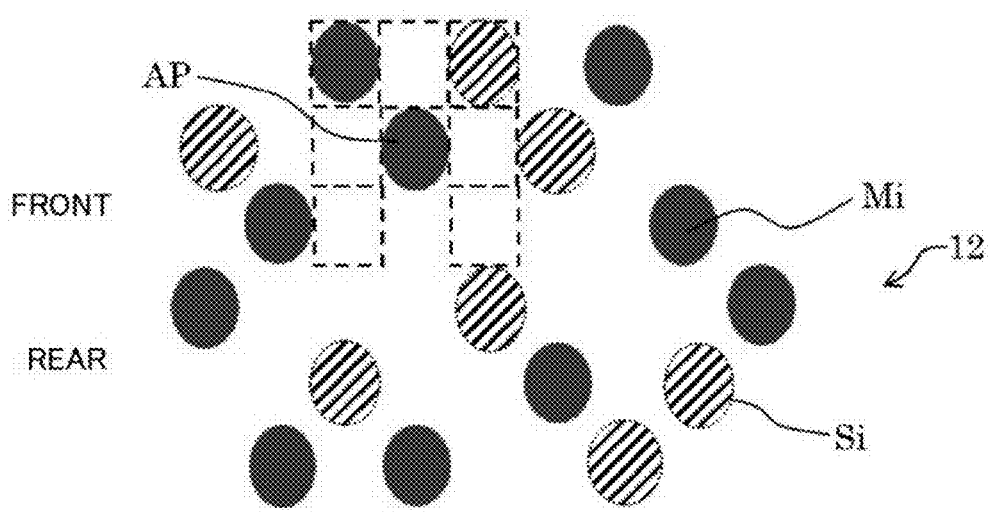
FIG. 7 is a diagram for showing a limit of replacement of droplets applicable to the exemplary embodiment of the present invention.

Next, a configuration applicable to the above exemplary embodiment of the present invention will be described. For example, as shown in FIG. 6, medium droplets Mi to be replaced (medium droplets Mi surrounded by broken lines in FIG. 6) may exist in a part (a central part of an image) that is not a rear end of an image. Such medium droplets Mi are not necessary to be replaced with small droplets Si, and the image density may be reduced in the case of replacement. Therefore, the ejection data generator 62 does not perform replacement processing of an attention pixel AP and a medium droplet Mi may be maintained when the total number of droplets disposed in seven adjacent pixels (seven pixels indicated by broken lines in FIG. 7) excluding the rear side of the attention pixel AP, which is a pixel in which a medium droplet Mi is disposed, is larger than a predetermined number in the original ejection data 12 as shown in FIG. 7. That is, when the total number of droplets disposed in the seven adjacent pixels is large, it is determined that an area where the medium droplet Mi exists is not the rear end area of the image, and thus the medium droplet Mi is maintained. In this way, unnecessary replacement processing is inhibited, and a reduction in density of an image may be inhibited.

Figure 8:
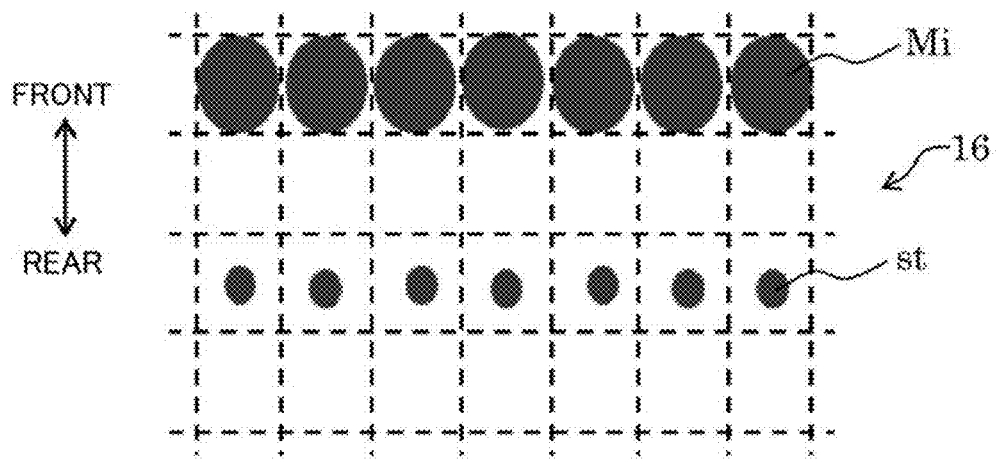
FIG. 8 is a diagram for showing a generation position of satellite droplets with respect to a moving speed of a sheet.
Figure 9:
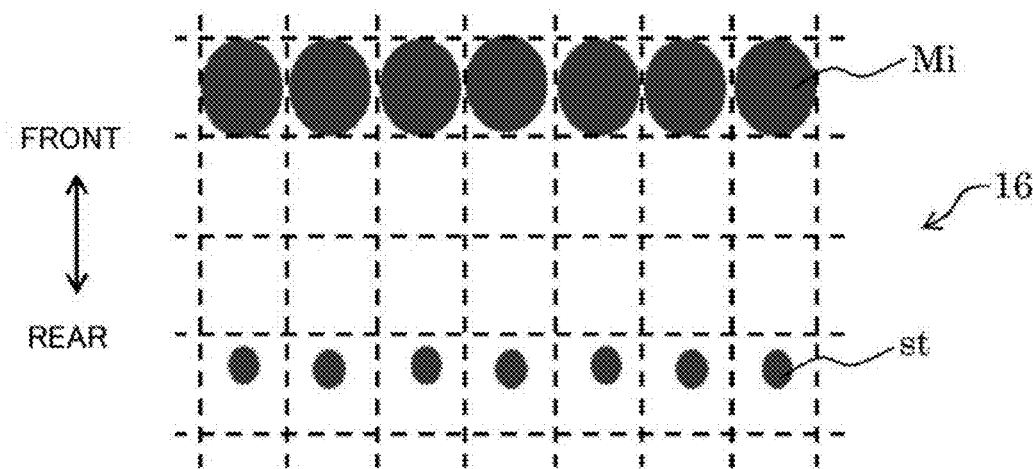
FIG. 9 is a diagram for showing a generation position of the satellite droplets with respect to a moving speed of a sheet.

Next, another configuration applicable to the above exemplary embodiment of the present invention will be described. A generation position of a satellite droplet st on the sheet 10 is changed depending on a speed of movement of the sheet 10 relative to the inkjet head 34K (hereinafter, referred to as a moving speed). FIG. 8 is a diagram showing an example of a dot image 16 formed on a sheet when a moving speed of the sheet is set as a first speed. FIG. 9 is a diagram showing an example of a dot image 16 formed on a sheet when a moving speed of the sheet is set as a second speed higher than the first speed. As shown in FIGS. 8 and 9, the satellite droplets st land on positions away from the main droplets (the medium droplets Mi shown in FIGS. 8 and 9) when the moving speed of the sheet is high. Therefore, the higher the moving speed of the sheet is, the larger the number of n may be. That is, when the moving speed of the sheet is high, more reward pixels are also included, compared with a case where the moving speed of the sheet is low, to determine whether to replace droplets.

For example, even though the satellite droplets st land on positions away from the main droplets when the moving speed of the sheet is high, the satellite droplets st are not noticeable on the sheet when other ink droplets are disposed on the above positions, and replacement processing of the droplets is not necessary. As described above, when the moving speed of the sheet is high, more rearward pixels are also considered to determine the replacement of droplets. Therefore, it is possible to inhibit unnecessary replacement processing of the droplets, and to inhibit reduction in density of an image. On the other hand, for example, even though satellite droplets st land on positions relatively close to the main droplets when the moving speed of the sheet is low, the satellite droplets st are likely to be noticeable on the sheet when the above positions are blank areas. Therefore, replacement processing of droplets is desired. As described above, when the moving speed of the sheet is low, replacement of droplets in a small number of pixels on the rear side is determined, thereby performing necessary replacement processing of droplets accurately.

Figure 10:
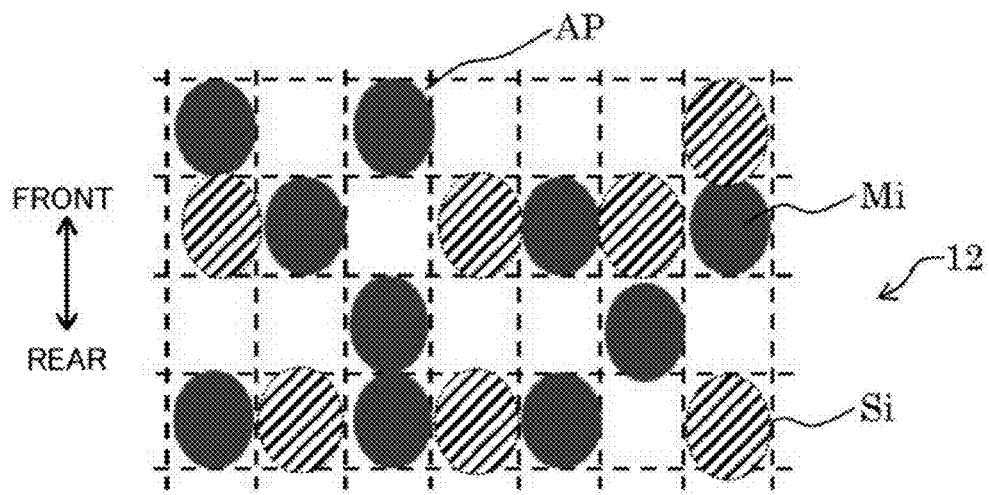
FIG. 10 is a diagram showing an example of original ejection data generated by first halftone processing.
Figure 11:
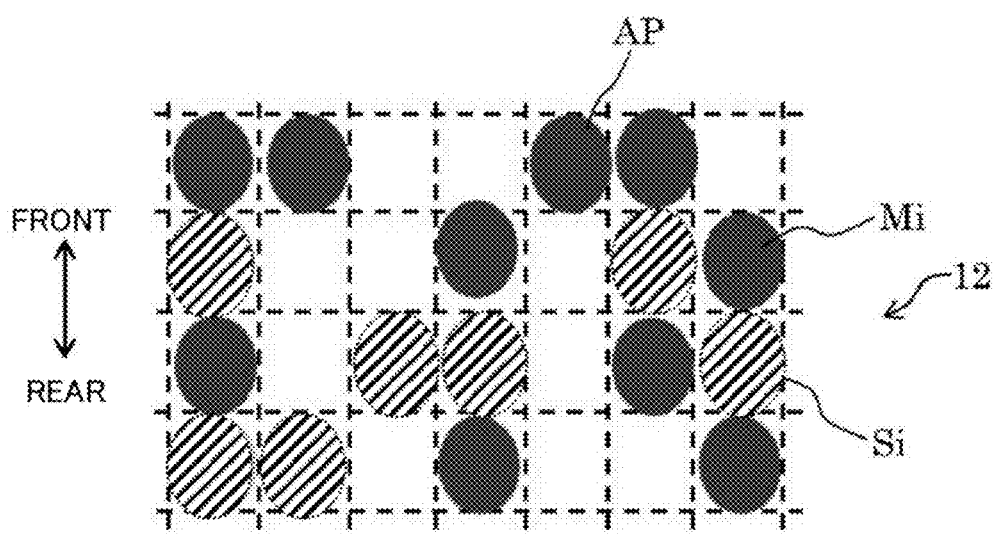
FIG. 11 is a diagram showing an example of original ejection data generated by second halftone processing.

Next, still another configuration applicable to the above exemplary embodiment of the present invention will be described. The arrangement of droplets in the generated original ejection data changes, even in the same target images depending on the contents of the halftone processing (a screen or a mask, a processing method, and the like that are use). FIG. 10 is a diagram showing an example of original ejection data 12 generated by the first halftone processing. FIG. 11 is a diagram showing an example of original ejection data 12 generated by the second halftone processing by which original ejection data, in which a large number of droplets are continuously arranged in a front-rear direction, is obtained as compared with the first halftone processing. Note that FIGS. 10 and 11 are diagrams showing the original ejection data 12 on a center side of the image. As shown in FIGS. 10 and 11, even in the original ejection data 12 representing the same halftone, blank pixels are likely to be arranged in a horizontal direction (a left-right direction) in FIG. 10, and blank pixels are likely to be arranged in a vertical direction (a front-rear direction) in FIG. 11. Therefore, when the above exemplary embodiment of the present invention is applied to the original ejection data 12 of each of FIGS. 10 and 11, the replacement processing of droplets is hardly performed in the original ejection data 12 of FIG. 10, whereas the replacement processing of droplets is easily performed in the original ejection data 12 of FIG. 11.

Therefore, when the original ejection data 12 is generated by the first halftone processing, the ejection data generator 62 sets n in the above exemplary embodiment to a first predetermined value to generate ejection data 14. When the original ejection data 12 is generated by the second halftone processing by which original ejection data 12, in which a large number of droplets are continuously arranged in the front-rear direction, is obtained as compared with the first halftone processing, the ejection data generator 62 sets n to a second predetermined value larger than the first predetermined value to generate ejection data 14. In this way, when the ejection data is generated from the original ejection data 12 (see FIG. 11), obtained by the second halftone processing, in which the blank pixels are likely to be arranged in the front-rear direction, n is set to be large (a second predetermined value). As a result, the medium droplet Mi to be replaced may be limited, and unnecessary replacement may be inhibited. Therefore, a reduction in the image density may be inhibited.

The present invention is not limited to the contents described above. For example, the inkjet recording apparatus 30 may eject ink droplets such as a large droplet and an extra-large droplet in addition to the small droplet and the medium droplet. In this case, for example, a large droplet or an extra-large droplet, instead of or together with the medium droplet, may be replaced with a smaller ink droplet following the above exemplary embodiment.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inkjet recording apparatus comprising:
   a nozzle configured to eject droplets comprising a first droplet and a second droplet larger than the first droplet;
   a moving mechanism that moves a sheet relative to the nozzle; and
   a processor configured to generate ejection data for the droplets, the ejection data corresponding to a dot image formed by ejecting the droplets from the nozzle on the sheet moved relatively to the nozzle by the moving mechanism, wherein the processor is configured to replace the second droplet for a pixel of interest in an original ejection data for generating the ejection data with the first droplet when the droplets are not ejected for n pixels in a row after the pixel of interest to generate the ejection data, where n is an integer of 2 or more.

2. The inkjet recording apparatus according to claim 1, wherein the processor does not replace the second droplet for the pixel of interest when the total number of droplets disposed on seven adjacent pixels other than a pixel after the pixel of interest in the original ejection data is larger than a predetermined number.

3. The inkjet recording apparatus according to claim 1, wherein the processor is configured to increase the integer n as a velocity of the sheet relative to the nozzle increases.

4. The inkjet recording apparatus according to claim 1, wherein the processor is configured to perform:

a first halftone processing for forming a first original ejection data; and a second halftone processing for forming a second original ejection data in which number of row pixels in front-back direction where the droplets are ejected is larger than in the first original ejection data, wherein the processor is configured to:
   set the integer n to a first predetermined value for the first halftone processing, and;
   set the integer n to a second predetermined value larger than the first predetermined value for the second halftone processing to generate the ejection data.

* * * * *